3,355,423
STABILIZATION OF HALOGENATED
POLYOLEFIN COMPOSITIONS
James P. Scullin, Pompton Lakes, and Arthur F. Fletcher,
Elizabeth, N.J., assignors, by mesne assignments, to
Tenneco Chemicals, Inc., a corporation of Delaware
No Drawing. Filed Sept. 25, 1962, Ser. No. 226,152
3 Claims. (Cl. 260—45.95)

This invention relates to the stabilization of halogenated polyolefins. More particularly it relates to halogenated polyolefin compositions that are stabilized against degradation under conditions of elevated temperatures and/or mechanical working.

Halogenated polyolefins undergo appreciable darkening when heated during thermal fabrication operations and when the fabricated articles are exposed to elevated temperatures for prolonged periods. This thermal sensitivity has seriously limited the applications in which the halogenated polyolefin may be employed.

Stabilizers that have been used to impart thermal stability to polyvinyl halide resins have been suggested for use in the stabilization of halogenated polyolefins against decomposition and degradation resulting from exposure to heat and light. These materials, however, have been found in most cases to be unsatisfactory for use as stabilizers for halogenated polyolefin compositions because they impart color to the compositions or because they fail to provide the required heat stability.

It is an object of this invention to provide stabilized halogenated polyolefin compositions. More particularly it is an object to stabilize halogenated polyolefins against the deteriorating effects of high temperatures. It is a further object to provide halogenated polyolefin compositions which are satisfactorily stabilized and which may be molded, extruded, or otherwise fabricated to form flexible, thermally stable products. Other objects of the invention will be apparent from the description that follows.

The above objects are accomplished in accordance with the present invention by incorporating in a halogenated polyolefin composition a heat stabilizing amount of a stabilizer which comprises a polyhydric alcohol and a phenol. In most cases approximately 1% to 10% and preferably 2% to 6% of the stabilizer based on the weight of the halogenated polyolefin will impart heat stability to the resinous composition. The stabilizer of the present invention is compatible with halogenated polyolefins and generally with the compounding ingredients used with these polymers, and it serves to protect the compositions from thermal degradation both during and subsequent to their fabrication.

The polymers to which this invention applies are the halogenated homopolymers and copolymers of olefins having from 2 to 6 carbon atoms per molecule, such as ethylene, propylene, 1-butene, 1-pentent, and 1-hexene. While these polymers are ordinarily and preferably chlorinated, they may also be brominated, iodinated, or fluorinated. The halogenated polyolefins treated according to this invention generally contain between 5% and 80% by weight of halogen. The novel stabilizers are particularly useful in chlorinated polyethylene compositions derived from normally solid polyethylene and having a chlorine content between approximately 20% and 70%. Processes for the production of these halogenated polyolefins are disclosed in Fawcett, U.S. Patent No. 2,183,556 and Hogan and Banks, U.S. Patent No. 2,825,721.

The polyhydric alcohols that may be used in the practice of this invention are those that contain at least two hydroxyl groups. These include, for example, ethylene glycol, propylene glycol, neopentyl glycol, glycerol, trimethylolethane, trimethylolpropane, trimethylolbutane, butanetriol-1,2,3, pentaerythritol, dipentaerythritol, tripentaerythritol, erythritol, α-methyl-D-glucoside, sorbitol, and mannitol as well as polymeric polyhydric alcohols, such as hydroxyethylcellulose. Also useful is the polymeric alcohol that has the formula

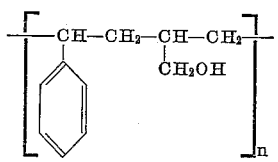

This material, which contains an average of 5.2 hydroxyl groups per mole and which has a molecular weight of approximately 1150, is marketed as Resinous Polyol X-450 by Shell Chemical Co. The preferred polyhydric alcohols for use in the novel stabilizers are pentaerythritol, dipentaerythritol, tripentaerythritol, and sorbitol. A single polyhydric alcohol or a mixture of two or more of these alcohols may be used. When a solid polyhydric alcohol, such as pentaerythritol, is used, it is preferably added to the halogenated polyolefin composition as a finely-divided powder.

The phenols that may be used in the stabilizer mixtures include a wide variety of monohydric and polyhydric phenols. The monohydric phenols include phenol and substituted phenolic compounds in which the substituents are halogen atoms, lower alkyl groups, aryl groups, nitro groups, carbalkoxy groups, and the like. A preferred group of monohydric phenols are alkylphenols having the formula

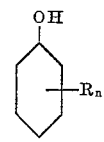

wherein R represents an alkyl group having from 1 to 8 carbon atoms and n represents a number in the range of 1 to 3. Illustrative of the monohydric phenols that may be present in the stabilizer mixture are the following: cresols, xylenols, carvacrol, thymol, tert. butylphenols, octylphenols, chlorophenols, bromophenols, nitrophenols, p-hydroxybenzoic acid, salicyclic acid, chlorosalicylic acids, salicylaldehyde, lower alkyl esters of p-hydroxybenzoic acid, lower alkyl esters of salicylic acid, and alkylphenylphenols.

The polyhydric phenols that may be used include both polynuclear phenols and those phenols that have two or more hydroxyl groups attached to a single aromatic nucleus. A preferred group of polyhydric phenols are polynuclear phenols that have the formula

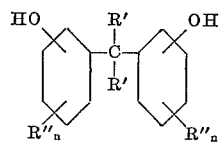

wherein each R' represents a hydrogen atom or a lower alkyl group, R" represents a lower alkyl group or a halogen atom, and n represents a number in the range of 0 to 3. Illustrative of the useful polyhydric phenols are the following: resorcinol, alkylresorcinols, catechol, hydroquinone, sorcinol, hydroxyhydroquinone, hexahydroxybenzene, 2,2'-bis(4-hydroxyphenyl)propane, 2,2'-bis(4-hydroxydichlorophenyl)propane, 2,2'-bis(4-hydroxyphenyl)butane, 4,4'-dihydroxybenzophenone, 4,4'-dihydroxyphenyl, 1,5-dihydroxynaphthalene, 2,2'-methylene bis(4-methyl-6-tert. butylphenol), 4,4'-methylene bis(2,6-di-tert. butylphenol), 2,2'-butylidene bis(4,6-dimethylphenol), 4,4'-butylidene bis(3-methyl-6-tert. butylphenol), 4,4'-thio bis(3-methyl-6-tert. butylphenol), 2,2'-dihydroxy-3,3',5,5'-tetramethylstilbene, methylene bis(β-naphthol), methylene bis(salicylic acid) 2,2'-isopropylidene bis (4-methyl-6-tert. butylphenol), N-salicoyl-p-aminophenol, and the like. A single phenol or a mixture of phenols may be used in the halogenated polyolefin compositions. If desired, a thiophenol, such as p-chlorothiophenol, may be used in place of part or all of the phenol in the stabilizer mixture.

For most applications, the stabilizer will contain approximately 0.15 part to 8 parts by weight of the polyhydric alcohol per part by weight of the phenol. The preferred compositions contain approximately 1 part to 5 parts by weight of the polyhydric alcohol per part by weight of the phenol.

The stabilizer components may be added individually to the halogenated polyolefin composition or a mixture of the components may be added.

The stabilizer may be incorporated in the halogenated polyolefin composition by any convenient procedure. For example, the halogenated polyolefin may be mixed with a polyhydric alcohol, a phenol, a plasticizer, and other ingredients, if any, with or without the aid of a volatile solvent, and the resulting mixture milled on rolls at 200° F. to 350° F. until it is homogeneous. The stabilized resin may then be removed from the mill in the form of a sheet or film of the desired thickness which may be used as such or subjected to polishing or embossing treatment. Alternatively, the stabilizer components may be incorporated by dissolving them in a solution of the resin. This solution may then be used as such, for example, as a varnish for coating or spraying on various materials or for casting articles in a mold. Stabilized halogenated polyolefins may also be obtained by removing the solvent from such a solution by evaporation or steam distillation.

The stabilized compositions of the present invention may contain any of the plasticizers that are ordinarily employed in halogenated polyolefin compositions. These include, for example, dioctyl phthalate, dibutyl sebacate, and tricresyl phosphate. The plasticizer is generally present in the amount of approximately 5 to 100 parts by weight per 100 parts by weight of the polymer. Other heat and light stabilizers as well as pigments, fillers, extenders, solvents, and the like may also be present in the stabilized resinous compositions.

The present invention is further illustrated by the examples that follow. It is to be understood, however, that these examples are given solely for the purpose of illustration and that the invention is not to be regarded as being limited to any of the specific materials or conditions recited therein except as set forth in the appended claims.

Example 1

Resinous compositions containing the stabilizers of this invention were prepared by milling a base formulation and the stabilizer components together for 5 minutes on a 2-roll differential speed mill at 330° F. The stabilized composition was then removed from the rolls as a flexible homogeneous sheet, 0.025 inch in thickness. The heat stability of the compositions was determined by placing 1 x 1 inch specimens which had been cut from the milled sheets in a forced-circulation air oven at 350° F. and removing specimens periodically until degradation was complete as indicated by color change. The specimens were then rated using the following color code:

C—Colorless
LY—Light yellow
Y—Yellow
LT—Light tan
T—Tan
L Br—Light brown
Br—Brown
Bl—Black The base formulation used in the preparation of the stabilized resinous compositions consisted of 100 parts by weight of chlorinated polyethylene (chlorine content, 56%), 45 parts by weight of di(2-ethylhexyl)phthalate, and 5 parts by weight of epoxidized soybean oil. The stabilizer components and the results of the heat stability tests are shown in Table I.

TABLE I

| Ex. No. | Stabilizer Components | Phr.[1] | Color after Indicated Number of Minutes at 350° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| 1A | Phenol / Pentek Powder[2] | 1 / 1 | C | LY | LY | Y | Y | Y | LT | LT | LT | T | T |
| 1B | Octylphenol / Pentek Powder | 1 / 1 | C | LY | LY | LY | Y | Y | Y | LT | LT | LT | LT |
| 1C | 2,6-di-tert.butyl-4-methylphenol / Pentek Powder | 1 / 1 | C | C | LY | LY | LY | LY | LY | LY | Y | Y | Y |
| 1D | Propyl p-hydroxybenzoate / Pentek Powder | 1 / 1 | C | LY | LY | LY | LY | Y | Y | LT | LT | LT | LT |
| 1E | Salicylic Acid / Pentek Powder | 1 / 1 | C | LY | Y | Y | LT | LT | LT | T | T | L Br | L Br |
| 1F | Salicylaldehyde / Pentek Powder | 1 / 1 | C | Y | Y | LT | LT | T | T | L Br | L Br | Br | Br |
| 1G | Tri(tert.butyl)-p-phenylphenol / Pentek Powder | 1 / 1 | C | Y | Y | Y | Y | LT | LT | T | T | T | T |
| 1H | o-Nitrophenol / Pentek Powder | 1 / 1 | C | LT | LT | T | T | L Br | L Br | Br | Br | Br | Br |
| 1I | Resorcinol / Pentek Powder | 1 / 1 | LY | Y | Y | LT | T | T | T | L Br | Br | Br | Br |
| 1J | Octylresorcinol / Pentek Powder | 1 / 1 | LY | Y | Y | LT | T | T | T | L Br | Br | Br | Br |
| 1K | 2,2-bis (4-hydroxyphenyl) propane / Pentek Powder | 1 / 1 | C | LY | LY | LY | Y | Y | Y | Y | Y | LT | LT |
| 1L | 2,2-bis (dichloro-4-hydroxyphenyl) propane / Pentek Powder | 1 / 1 | C | LY | LY | LY | LY | Y | Y | Y | LT | LT | LT |
| 1M | 4,4'-methylene bis (2,6-di-tert. butylphenol) / Pentek Powder | 1 / 1 | LY | Y | Y | Y | Y | Y | Y | Y | Y | Y | Y |
| 1N | 4,4'-thio bis (6-tert. butyl-3-methylphenol) / Pentek Powder | 1 / 1 | C | Y | LT | LT | LT | LT | T | T | T | T | T |
| 1O | N-salicoyl p-aminophenol / Pentek Powder | 1 / 1 | C | LY | LY | LY | Y | Y | LT | T | L Br | Br | Br |
| 1P | p-Chlorothiophenol / Pentek Powder | 1 / 1 | C | LY | LY | LY | Y | Y | Y | LT | T | T | Br |
| 1Q | None | | Y | T | T | Br | Br | Bl | | | | | |

[1] Parts by weight of stabilizer component per 100 parts by weight of chlorinated polyethylene.

[2] Technical grade of pentaerythritol marketed by Heyden Newport Chemical Corporation.

Example 2

A series of chlorinated polyethylene compositions was prepared in which the stabilizer mixture consisted of powdered technical pentaerythritol (Pentek) and a phenol. The base formulation and the method by which the compositions were prepared were the same as those described in Example 1. The results of the heat stability tests at 375° F. are given in Table II.

Example 3

A series of chlorinated polyethylene compositions was prepared in which the stabilizer mixture consisted of a polyhydric alcohol and either 2,2-bis (4-hydroxyphenyl) propane or 2,6-di-tert. butyl-4-methylphenol. The base formulation and the method by which the compositions were prepared were the same as those described in Example 1. The results of the heat stability tests at 350° F. are given in Table III.

TABLE II

| Ex. No. | Stabilizer Components | Phr. | Color after Indicated Number of Minutes at 375° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| 2A | Phenol / Pentek Powder | 1/1 | C | Y | Y | LT | LT | T | T | L Br | Br | Br | Bl |
| 2B | Octylphenol / Pentek Powder | 1/1 | C | LY | Y | Y | LT | LT | LT | LT | T | T | T |
| 2C | 2,6-di-tert.butyl-4-methylphenol / Pentek Powder | 1/1 | C | C | LY | LY | LY | LY | Y | Y | Y | Y | Y |
| 2D | Propyl p-hydroxybenzoate / Pentek Powder | 1/1 | C | LY | Y | Y | LT | LT | LT | L Br | Br | Br | Bl |
| 2E | Salicylic Acid / Pentek Powder | 1/1 | C | LT | T | T | T | L Br | Br | Br | Br | Br | Bl |
| 2F | Salicylaldehyde / Pentek Powder | 1/1 | C | LT | T | T | L Br | Br | Br | Br | Br | Br | Bl |
| 2G | Tri(tert.butyl)-p-phenylphenol / Pentek Powder | 1/1 | C | Y | LT | T | T | LBr | L Br | L Br | L Br | L Br | L Br |
| 2H | o-Nitrophenol / Pentek Powder | 1/1 | C | LT | T | T | T | L Br | L Br | Br | Br | Br | Bl |
| 2I | Resorcinol / Pentek Powder | 1/1 | LY | LT | LT | T | T | L Br | Br | Br | Br | Br | Br |
| 2J | Octylresorcinol / Pentek Powder | 1/1 | LY | LT | LT | T | T | L Br | Br | Br | Br | Br | Br |
| 2K | 2,2-bis(4-hydroxyphenyl) propane / Pentek Powder | 1/1 | C | LY | Y | Y | LT | LT | T | T | L Br | Br | Br |
| 2L | 2,2-bis (dichloro-4-hydroxyphenyl)propane / Pentek Powder | 1/1 | C | LY | LY | Y | LT | T | T | L Br | Br | Br | Br |
| 2M | 4,4'-methylene bis (2,6-ditert.butylphenol) / Pentek Powder | 1/1 | LY | Y | Y | Y | Y | Y | Y | LT | LT | LT | LT |
| 2N | 4,4'-thiobis (6-tert.butyl-3-methylphenol) / Pentek Powder | 1/1 | C | Y | LT | LT | LT | T | T | L Br | L Br | Br | Br |
| 2O | N-salicoyl-p-aminophenol / Pentek Powder | 1/1 | C | LY | Y | LT | T | T | L Br | L Br | Br | Br | Bl |
| 2P | p-Chlorothiophenol / Pentek Powder | 1/1 | C | LY | Y | LT | LT | LT | T | T | Br | Br | Bl |
| 2Q | None | | Y | T | Br | Bl | | | | | | | |

TABLE III

| Ex. No. | Stabilizer Components | Phr. | Color after Indicated Number of Minutes at 350° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| 3A | 2,2-bis (4-hydroxyphenyl) propane / Pentek Powder | 1/1 | C | LY | LY | LY | Y | Y | Y | Y | Y | LT | LT |
| 3B | 2,2-bis (4-hydroxyphenyl) propane / Sorbitol | 1/1 | C | LY | LY | LY | Y | Y | Y | Y | Y | LT | LT |
| 3C | 2,2-bis (4-hydroxyphenyl) propane / Neopentyl glycol | 1/1 | C | LY | Y | LT | T | T | T | L Br | L Br | L Br | L Br |
| 3D | 2,2-bis (4-hydroxyphenyl) propane / Trimethylolethane | 1/1 | C | LY | Y | LT | T | T | T | L Br | L Br | L Br | L Br |
| 3E | 2,2-bis (4-hydroxyphenyl) propane / Tripentaerythritol | 1/1 | C | LY | LY | Y | Y | Y | Y | Y | Y | LT | LT |
| 3F | 2,2-bis (4-hydroxyphenyl) propane / Resinous Polyol X-450 | 1/1 | C | LY | Y | Y | LT | T | T | L Br | L Br | L Br | L Br |
| 3G | 2,2-bis (4-hydroxyphenyl) propane / α-Methyl-D-glucoside | 1/1 | C | LY | Y | Y | LT | LT | T | T | T | T | T |
| 3H | 2,2-bis (4-hydroxyphenyl) propane / Hydroxyethylcellulose | 1/1 | C | Y | LT | LT | T | L Br | L Br | L Br | L Br | Br | Br |
| 3I | 2,6-di-tert. butyl-4-methylphenol / Pentek Powder | 1/1 | C | C | LY | LY | LY | LY | LY | LY | Y | Y | Y |
| 3J | 2,6-di-tert. butyl-4-methylphenol / Neopentyl glycol | 1/1 | C | LY | LY | Y | Y | Y | Y | LT | T | T | T |
| 3K | 2,6-di-tert. butyl-4-methylphenol / Trimethylolethane | 1/1 | C | LY | LY | Y | Y | Y | Y | LT | T | T | T |
| 3L | 2,6-di-tert. butyl-4-methylphenol / Resinous Polyol X-450 | 1/1 | C | LY | LY | Y | Y | Y | LT | LT | LT | T | T |
| 3M | 2,6-di-tert. butyl-4-methylphenol / α-Methyl-D-glucoside | 1/1 | C | LY | LY | LY | Y | Y | Y | LT | T | T | T |
| 3N | 2,6-di-tert. butyl-4-methylphenol / Hydroxyethylcellulose | 1/1 | C | LY | LT | LT | T | T | T | L Br | L Br | L Br | L Br |
| 3O | None | | Y | T | T | Br | Br | Bl | | | | | |

Example 4

A series of chlorinated polyethylene compositions was prepared in which the stabilizer mixture consisted of a polyhydric alcohol and either 2,2-bis (4-hydroxyphenyl) propane or 2,6-di-tert. butyl-4-methylphenol. The base formulation and the method by which the compositions were prepared were the same as those described in Example 1. The results of the heat stability tests at 375° are given in Table IV.

Example 5

A series of chlorinated polyethylene compositions was prepared in which the stabilizer mixture consisted of a polyhydric alcohol and a phenol. The base formulation and the method by which the compositions were prepared were the same as those described in Example 1. The stabilizer components, the amounts of each that were used, and the results of the heat stability tests at 350° F. are given in Table V.

TABLE IV

| Ex. No. | Stabilizer Components | Phr. | Color after Indicated Number of Minutes at 375° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| 4A | 2,2-bis (4-hydroxyphenyl) propane / Pentek Powder | 1/1 | C | LY | Y | Y | LT | LT | T | T | L Br | Br | Br |
| 4B | 2,2-bis (4-hydroxyphenyl) propane / Sorbitol | 1/1 | C | LY | Y | LT | LT | T | T | T | L Br | Br | Br |
| 4C | 2,2-bis (4-hydroxyphenyl) propane / Neopentyl glycol | 1/1 | C | Y | LT | LT | T | T | L Br | Br | Br | Bl | |
| 4D | 2,2-bis (4-hydroxyphenyl) propane / Trimethylolethane | 1/1 | C | Y | LT | LT | T | T | L Br | Br | Br | Bl | |
| 4E | 2,2-bis (4-hydroxyphenyl) propane / Tripentaerythritol | 1/1 | C | LY | Y | LT | LT | T | T | T | L Br | Br | Br |
| 4F | 2,2-bis (4-hydroxyphenyl) propane / Resinous Polyol X-450 | 1/1 | C | LY | LT | LT | T | T | L Br | Br | Br | Bl | |
| 4G | 2,2-bis (4-hydroxyphenyl) propane / α-Methyl-D-glucoside | 1/1 | C | LY | Y | LT | T | T | T | L Br | Br | Br | Bl |
| 4H | 2,2-bis (4-hydroxyphenyl) propane / Hydroxyethylcellulose | 1/1 | C | LT | T | T | T | L Br | L Br | L Br | Br | Br | Bl |
| 4I | 2,6-di-tert. butyl-4-methylphenol / Pentek Powder | 1/1 | C | C | LY | LY | LY | LY | Y | Y | Y | Y | Y |
| 4J | 2,6-di-tert. butyl-4-methylphenol / Neopentyl glycol | 1/1 | C | LY | LY | Y | Y | LT | T | T | L Br | Br | Br |
| 4K | 2,6-di-tert. butyl-4-methylphenol / Trimethylolethane | 1/1 | C | LY | LY | Y | Y | LT | T | T | L Br | Br | Br |
| 4L | 2,6-di-tert. butyl-4-methylphenol / Resinous Polyol X-450 | 1/1 | C | LY | Y | Y | LT | LT | T | T | L Br | L Br | L Br |
| 4M | 2,6-di-tert. butyl-4-methylphenol / α-Methyl-D-glucoside | 1/1 | C | LY | LY | Y | Y | LT | T | T | L Br | L Br | L Br |
| 4N | 2,6-di-tert. butyl-4-methylphenol / Hydroxyethylcellulose | 1/1 | C | Y | Y | LT | T | T | T | L Br | Br | Br | Br |
| 4O | None | | Y | T | Br | Bl | | | | | | | |

TABLE V

| Ex. No. | Stabilizer Components | | | | Color After Indicated Number of Minutes at 350° F. | | | | | | | | | | |
|---|---|---|---|---|---|---|---|---|---|---|---|---|---|---|---|
| | Phenol | Phr. | Polyhydric Alcohol | Phr. | 0 | 15 | 30 | 45 | 60 | 75 | 90 | 105 | 120 | 135 | 150 |
| 5A | 2,2-bis (4-hydroxyphenyl) propane | 1 | Pentek Powder | 1 | C | LY | LY | LY | Y | Y | Y | Y | Y | LT | LT |
| 5B | do | 2 | do | 2 | C | LY | LY | Y | Y | Y | Y | Y | LT | LT | LT |
| 5C | do | 3 | do | 3 | C | LY | LY | Y | Y | Y | Y | LT | LT | LT | LT |
| 5D | do | 5 | do | 1 | C | LY | LT | LT | T | T | T | L Br | L Br | L Br | L Br |
| 5E | do | 1 | do | 5 | C | LY | LY | LY | Y | Y | Y | Y | Y | Y | Y |
| 5F | Di-tert. butyl-p-cresol | 1 | do | 1 | C | LY | LY | LY | LY | LY | LY | LY | Y | Y | Y |
| 5G | do | 2 | do | 2 | C | C | LY | LY | LY | LY | LY | LY | Y | Y | T |
| 5H | do | 5 | do | 1 | C | C | Y | Y | LT | LT | T | T | L Br | L Br | L Br |
| 5I | do | 1 | do | 5 | C | C | LY | LY | LY | LY | LY | LY | LY | Y | Y |
| 5J | 2,2-bis (4-hydroxyphenyl) propane | 2 | Resinous Polyol X-450 | 2 | C | LY | Y | Y | Y | LT | LT | LT | T | T | T |
| 5K | do | 5 | do | 1 | C | Y | LT | LT | LT | T | T | T | L Br | Br | Br |
| 5L | do | 1 | do | 5 | C | LY | Y | Y | Y | LT | LT | LT | T | T | L Br |
| 5M | do | 2 | Neopentyl glycol | 2 | C | LY | Y | Y | Y | LT | LT | LT | T | T | T |
| 5N | do | 5 | do | 1 | C | LY | LT | LT | T | T | T | T | L Br | L Br | L Br |
| 5O | do | 1 | do | 5 | C | Y | Y | Y | Y | LT | LT | LT | T | L Br | L Br |
| 5P | do | 2 | α-Methyl-D-glucoside | 2 | C | LY | LY | Y | Y | LT | LT | LT | T | L Br | L Br |
| 5Q | do | 5 | do | 1 | C | Y | LT | LT | LT | T | T | LT | T | L Br | L Br |
| 5R | do | 1 | do | 5 | C | Y | Y | Y | Y | LT | LT | LT | T | L Br | L Br |
| 5S | do | 2 | Trimethylolethane | 2 | C | LY | Y | T | T | L Br | L Br | L Br | Br | Br | Br |
| 5T | do | 5 | do | 1 | C | Y | LT | LT | LT | LT | T | T | T | Br | Br |
| 5U | do | 1 | do | 5 | C | Y | Y | Y | Y | Y | LT | LT | LT | L Br | L Br |
| 5V | Di-tert. butyl-4-methylphenol | 2 | Sorbitol | 2 | C | C | LY | LY | LY | LY | LY | LY | LY | Y | Y |
| 5W | do | 5 | do | 1 | C | LY | Y | Y | LT | LT | LT | T | T | T | T |
| 5X | do | 1 | do | 5 | C | C | LY | LY | LY | LY | LY | LY | LY | Y | Y |

Comparative examples

For comparative purposes, a series of chlorinated polyethylene compositions was prepared in which the stabilizer was either a polyhydric alcohol or a phenol. The base formulation and the method by which the compositions were prepared were the same as those described in Example 1. The results of the heat stability tests at 350° F. are given in Table VI.

atoms, nitro, carboxyl, and hydroxyl and $n$ represents a number in the range of zero to 3 and phenols having the structure

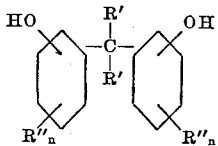

TABLE VI

| Ex. No. | Stabilizer | Phr. | Color after Indicated Number of Minutes at 350° F. | | | | | | | | | | |
|---|---|---|---|---|---|---|---|---|---|---|---|---|---|
| | | | 0 | 15 | 30 | 45 | 60 | 75 | 90 | 105 | 120 | 135 | 150 |
| A | Pentek Powder | 1 | C | LY | LY | Y | Y | LT | T | T | L Br | Br | Bl |
| B | ---do--- | 3 | C | C | LY | LY | Y | Y | LT | T | L Br | Br | Br |
| C | ---do--- | 5 | C | C | LY | LY | LY | Y | LT | T | L Br | Br | Br |
| D | Sorbitol | 1 | C | C | LY | LY | Y | Y | LT | T | L Br | Br | Br |
| E | ---do--- | 3 | C | C | LY | LY | Y | Y | LT | T | L Br | Br | Br |
| F | ---do--- | 5 | C | C | LY | LY | LY | Y | LT | T | L Br | Br | Br |
| G | Trimethylolethane | 1 | C | LY | Y | Y | Y | Y | LT | T | L Br | Br | Br |
| H | ---do--- | 3 | C | LY | LY | Y | Y | Y | LT | T | L Br | Br | Br |
| I | ---do--- | 5 | C | LY | LY | LY | Y | Y | LT | T | L Br | Br | Br |
| J | Neopentyl glycol | 1 | C | LY | Y | Y | LT | T | T | T | L Br | Br | Br |
| K | ---do--- | 3 | C | LY | Y | Y | Y | LT | T | T | T | L Br | Br |
| L | ---do--- | 5 | C | LY | Y | Y | Y | LT | T | T | T | L Br | Br |
| M | Resinous Polyol X-450 | 3 | C | Y | Y | LT | LT | LT | T | L Br | L Br | Br | Br |
| N | ---do--- | 5 | C | Y | Y | LT | LT | LT | T | L Br | L Br | Br | Br |
| O | 2,2-bis (4-hydroxyphenyl) propane | 1 | Y | Y | Y | LT | LT | LT | T | T | T | Br | Br |
| P | 2,6-di-tert. butyl-4-methylphenol | 1 | LY | LY | Y | Y | LT | LT | LT | T | T | L Br | L Br |

The foregoing examples have illustrated the manner in which the novel stabilizers may be combined with a halogenated polyolefin to form compositions that may be used in the preparation of calendered sheets and films. In addition these stabilizers may be used with chlorinated polyethylene or other halogenated polyolefins in plastisol, organosol, extrusion, injection molding, and solvent formulations to form products that are characterized by good color and clarity and excellent heat stability.

What is claimed is:

1. A thermally stabilized resinous composition comprising chlorinated polyethylene containing approximately 20% to 70% by weight of chlorine and approximately 2% to 6% based on the weight of said chlorinated polyethylene of a stabilizer, said stabilizer comprising a polyhydric alcohol selected from the group consisting of pentaerythritol and sorbitol and a phenol selected from the group consisting of phenols having the structure

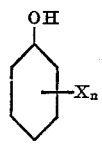

wherein X represents a substituent selected from the group consisting of halogen, alkyl having from 1 to 8 carbon atoms, nitro, carboxyl, and hydroxyl and $n$ represents a number in the range of zero to 3 and phenols having the structure wherein each $R'$ represents a member selected from the group consisting of hydrogen and lower alkyl, $R''$ represents a member selected from the group consisting of lower alkyl and halogen, and $n$ represents a number in the range of zero to 3 and containing approximately 0.15 part to 8 parts by weight of said polyhydric alcohol per part by weight of said phenol.

2. The composition of claim 1 wherein the polyhydric alcohol is pentaerythritol.

3. The composition of claim 1 wherein the polyhydric alcohol is sorbitol.

References Cited

UNITED STATES PATENTS

| 2,183,556 | 12/1939 | Fawcett et al. | 260—94.9 |
| 2,480,009 | 8/1949 | Fletcher | 260—40.85 |
| 2,578,904 | 12/1951 | Stamatoff | 260—45.95 |

FOREIGN PATENTS

| 702,848 | 5/1951 | Great Britain. |
| 797,054 | 6/1958 | Great Britain. |

DONALD E. CZAJA, *Primary Examiner.*

LEON J. BERCOVITZ, *Examiner.*

H. E. TAYLOR, JR., *Assistant Examiner.*